United States Patent
Mohammed et al.

(10) Patent No.: US 10,341,267 B2
(45) Date of Patent: Jul. 2, 2019

(54) ANONYMIZED IDENTIFIERS FOR SECURE COMMUNICATION SYSTEMS

(71) Applicant: Microsoft Technology Licensing, LLC, Redmond, WA (US)

(72) Inventors: Farookh Mohammed, Redmond, WA (US); Krishnan Ananthanarayanan, Redmond, WA (US); Alexey Pikin, Moscow (RU); Mieszko G. Matkowski, Woodinville, WA (US); Andrey Belenko, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 15/187,215

(22) Filed: Jun. 20, 2016

(65) Prior Publication Data
US 2017/0366478 A1     Dec. 21, 2017

(51) Int. Cl.
*H04L 12/58* (2006.01)
*H04L 29/06* (2006.01)

(52) U.S. Cl.
CPC ............. *H04L 51/02* (2013.01); *H04L 51/04* (2013.01); *H04L 63/0421* (2013.01); *H04L 63/0435* (2013.01)

(58) Field of Classification Search
None
See application file for complete search history.

(56) References Cited

U.S. PATENT DOCUMENTS

| 6,505,162 B1 | 1/2003 | Wang et al. |
| 7,287,057 B2 | 10/2007 | Lagarde et al. |
| 7,437,292 B2 | 10/2008 | Feldes et al. |

(Continued)

FOREIGN PATENT DOCUMENTS

| EP | 1418519 | 5/2004 |
| WO | WO-0022549 | 4/2000 |
| WO | WO-2015007228 | 1/2015 |

OTHER PUBLICATIONS

Cheung, Tony, "Using IM Bats for Jabber", Published on: Oct. 20, 2004 Available at: http://www.chatopus.com/articles/bots.html.

(Continued)

*Primary Examiner* — William J. Goodchild
(74) *Attorney, Agent, or Firm* — Schwegman Lundberg & Woessner, P.A.

(57) ABSTRACT

A computer system comprises computer storage holding a plurality of code modules, one or more processors and a communication system. The one or more processors are configured to execute the code modules and thereby implement the bots. The communication system comprises a message relay and an anonymized identifier generator. The message relay is configured to receive a message comprising an identifier of a user and an identifier of a target one of the bots. The anonymized identifier generator is configured to generate an anonymized identifier of the user unique to the target bot, by applying an anonymization function to the user identifier and the bot identifier in the message. The message relay is configured to transmit to the target bot a version of the message, which comprises the anonymized user identifier and does not include the user identifier, wherein the user identifier is not rendered accessible to the target bot.

20 Claims, 5 Drawing Sheets

(56) References Cited

U.S. PATENT DOCUMENTS

| | | |
|---|---|---|
| 7,747,785 B2 | 6/2010 | Baker et al. |
| 7,752,554 B2 | 7/2010 | Biggs et al. |
| 7,870,199 B2 | 1/2011 | Galli et al. |
| 7,949,869 B2 | 5/2011 | Deshpande et al. |
| 8,027,839 B2 | 9/2011 | Da Palma et al. |
| 8,204,984 B1 | 6/2012 | Aziz et al. |
| 8,250,192 B2 | 8/2012 | Bowerman |
| 8,326,928 B2 | 12/2012 | Slotznick |
| 8,352,873 B2 | 1/2013 | Craig et al. |
| 8,660,244 B2 | 2/2014 | Blagsvedt et al. |
| 8,769,028 B2 | 7/2014 | Herold et al. |
| 8,787,553 B2 | 7/2014 | Fan et al. |
| 8,825,735 B2 | 9/2014 | Gamaley et al. |
| 9,043,407 B1 | 5/2015 | Gaulke et al. |
| 9,590,956 B1* | 3/2017 | Ryan ................. G06F 16/22 |
| 2003/0182391 A1 | 9/2003 | Leber et al. |
| 2003/0220972 A1 | 11/2003 | Montet et al. |
| 2007/0043878 A1 | 2/2007 | Carlson et al. |
| 2007/0172063 A1 | 7/2007 | Biggs et al. |
| 2008/0025328 A1 | 1/2008 | Alberts |
| 2008/0288467 A1 | 11/2008 | Szeto et al. |
| 2009/0055485 A1 | 2/2009 | Tsai et al. |
| 2009/0234638 A1 | 9/2009 | Ranjan et al. |
| 2010/0122082 A1 | 5/2010 | Deng et al. |
| 2010/0205452 A1* | 8/2010 | Griffin ............... H04L 9/3231 713/186 |
| 2011/0066686 A1* | 3/2011 | Gamaley ............ H04L 12/1822 709/206 |
| 2012/0260263 A1 | 10/2012 | Edoja |
| 2014/0316991 A1* | 10/2014 | Moshal ................ G06Q 20/14 705/64 |
| 2015/0081476 A1* | 3/2015 | Rego ................ G06Q 30/0615 705/26.42 |
| 2015/0304300 A1* | 10/2015 | Bender .............. H04L 12/1895 726/4 |
| 2016/0322050 A1 | 11/2016 | Wang et al. |
| 2017/0324866 A1 | 11/2017 | Segre et al. |
| 2017/0324868 A1 | 11/2017 | Tamblyn et al. |
| 2017/0366479 A1 | 12/2017 | Ladha et al. |

OTHER PUBLICATIONS

Yang, et al., "An Instant Messaging with Automatic Language Translation", In Proceedings of 3rd IEEE International Conference on Ubi-media Computing, Jul. 2010, pp. 312-316.

"International Search Report and Written Opinion", Application No. PCT/US2017/036928, dated Sep. 15, 2017, 10 pages.

"International Search Report and Written Opinion", Application No. PCT/US2017/036929, dated Sep. 12, 2017, 11 pages.

"Non-Final Office Action", U.S. Appl. No. 15/187,330, dated Jan. 26, 2018, 9 pages.

* cited by examiner

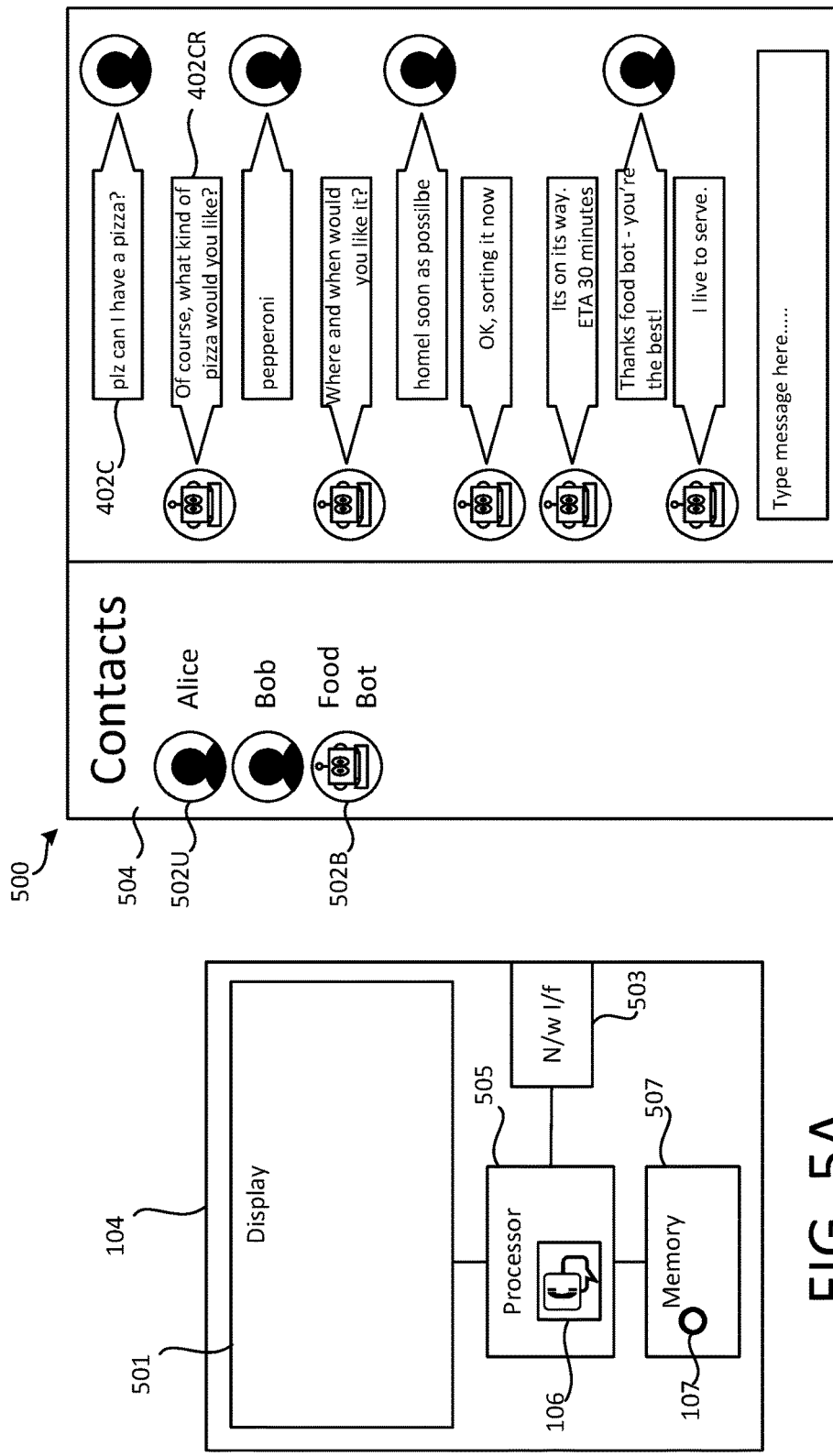

ANONYMIZED IDENTIFIERS FOR SECURE COMMUNICATION SYSTEMS

TECHNICAL FIELD

The present invention relates to a communication system for effecting communication between users and bots (i.e. autonomous software agents).

BACKGROUND

Communication systems allow users to communicate with each other over a communication network e.g. by conducting a communication event over the network. The network may be, for example, the Internet or public switched telephone network (PSTN). During a call, audio and/or video signals can be transmitted between nodes of the network, thereby allowing users to transmit and receive audio data (such as speech) and/or video data (such as webcam video) to each other in a communication session over the communication network.

Such communication systems include Voice or Video over Internet protocol (VoIP) systems. To use a VoIP system, a user installs and executes client software on a user device. The client software sets up VoIP connections as well as providing other functions such as registration and user authentication. In addition to voice communication (or alternatively), the client may also set up connections for communication events, for instant messaging ("IM"), screen sharing, or whiteboard sessions.

A communication event may be conducted between a user(s) and a "bot", which is and intelligent, autonomous software agent. A bot is an autonomous computer program that carries out tasks on behalf of users in a relationship of agency. The bot runs continuously for some or all of the duration of the communication event, awaiting messages which, when detected, trigger automated tasks to be performed in response to those messages by the bot. A bot may exhibit artificial intelligence (AI), whereby it can simulate certain human intelligence processes, for example to generate human-like responses to messages sent by the user in the communication event, thus facilitating a two-way conversation between the user and the bot via the network. That is, to generate responses to messages automatically so as provide a realistic conversational experience for the user based on natural language.

SUMMARY

With the shift towards the CaaP (conversation as a platform) paradigm, bots are becoming the new medium and channel to enable rich user interactions. Actions that have traditionally been performed using apps are increasing now performed using bots. Just as a wide variety of apps is currently available from numerous third party develops, similar trends are expected to be observed for bots in the near future.

This brings about an interesting problem, which is one of collusion between bots developed and maintained by different third parties. For illustration purposes, suppose an insurance bot could collude with a drug company bot and charge more for users who are using a certain medication. In terms of user privacy, it would be desirable to make such collusion between third party bots impossible (at the very least in a scenario in which the user has not given his informed consent).

The present invention solves this problem by managing the way in which user identities are released to bots. Communications between the users and the different third party bots take place via a message relay. The message relay only every releases, to each of the third party bots, an anonymized user identifier, which is unique to that bot. The anonymized user identifier constitutes a consistent user identity from the perspective of that bot, but is meaningless to any of the other bots, and in particular cannot be matched to the anonymized user identifier of the same user supplied to a different one of the bots.

A first aspect of the present invention is directed to a computer system comprising computer storage holding a plurality of code modules, one or more processors and a communication system. The one or more processors are configured to execute the code modules and thereby implement the bots. The communication system comprises a message relay and an anonymized identifier generator. The message relay is configured to receive a message comprising an identifier of a user (original user identifier) and an identifier of a target one of the bots. The anonymized identifier generator is configured to generate an anonymized identifier of the user unique to the target bot, by applying an anonymization function to the user identifier and the bot identifier in the message. The message relay is configured to transmit to the target bot a version of the message, which comprises the anonymized user identifier and does not include the user identifier, wherein the user identifier is not rendered accessible to the target bot.

The communication system acts as a trusted intermediary between the users and the bots, which may be independent, third party bots. Provided the user trusts the communication system, he can be confident that the communication system won't allow the bots to collude with one another.

Note "unique" in this context means unique within the plurality of bots, i.e. no two of the plurality of bots receives the same anonymized user identifier.

The bots may be configured to, in response to receiving the version of the message, automatically generate a response to the version of the message which includes the anonymized user identifier, and transmit the generated response to the message relay. The message relay may be configured to detect the anonymized user identifier in the response, and transmit a version of the response to the user.

Preferably the anonymized version of the user identifier is an encrypted version of the user identifier, generated by applying an encryption process unique to that bot. For example, applying the encryption process may comprise determining a secret associated with and unique to the bot identifier in a cryptographic database, and applying an encryption function to the user identifier and the secret. That is, a cryptographic secret unique to that bot.

The advantage of anonymizing the user identifier based on encryption is that it does require a look-up table to implement the anonymization function. That is, there is no need for the message relay to store a record of the anonymized user identifier assigned to each of the original user identifiers—in the worst case scenario, this would require the amount of storage to scale as O(N*M) as N and M increase, N being the number of users and M being the number of bots (as the are M anonymized identifier per user). That is, it could need up to one anonymized identifier per user per bot top be stored within the communication system.

By contrast, when anonymized based on encryption, the message relay does not need to keep a record of the anonymized user identifier it has generated—all it needs to know is the particular encryption process applied for each bot, for example each bot's unique secret. When it receives an anonymized user identifier back from one of the bots, it can simply reverse that bot's encryption process to decrypt the anonymized user identifier (i.e. to obtain the original user identifier), and transmit a version of the response to the user using the decrypted identifier. That is, the message relay may be configured to apply to the anonymized user identifier received in the response a decryption process for reversing the encryption process unique to that bot. For example, the anonymized user identifier may be decrypted using the secret unique to that bot in the cryptographic database.

Where the user identifier received in the message from the user is encrypted, the amount of storage required only scales with the number or bots M as O(M) (e.g. one stored secret per bot) and is independent of the number of users N. For example, the user identifier may be a username, or an authentication token issued to the user (which may or may not comprise the username).

Alternatively, the encryption function may be applied to another user identifier that is associated with the user identifier in a user database of the communication system. That is, another user identifier associated with the user identifier may be encrypted and transmitted to the bot, rather than the user identifier received in the message per se. Whilst this may need additional storage, this still only scales with the number of users N as O(N), thus the overall storage requirements only scale as O(M)+O(N)– still a significant improvement compared with O(N*M). That is, one mapping per user (O(N)) plus one secret per bot (O(M)) at the communication system as opposed to one mapping per user per bot O(M*N).

Note however that the possibility of an O(M*M) lookup table may be used in other, less-preferred embodiments of the present invention.

For example, the user database may already be maintained as part of the communication system. For example, the user identifier received in the message may be an authentication token, and the other user identifier may be a username mapped to (i.e. associated with) the encryption token in the user database.

Viewed from a different perspective, the combined operations of retrieving the other user identifier associated with the received user identifier, and applying the encryption function to the retrieved identifier also constitute applying an encryption function to the user identifier, wherein the retrieval of the other user identifier is part of that encryption function.

The encryption function may be a symmetrical encryption function.

The message relay is configured to apply to data of the user identifier a cryptographic signature function to generate a cryptographic signature of the communication system, which is included in the version of the message transmitted to the bot. In this context "data of the user identifier" can mean at least part of the original (unencrypted) user identifier, or at least part of the encrypted user identifier. That is, the signature can be applied before or after encryption.

This allows the message relay to reject any message received from any of the bots comprising an anonymized identifier unless (i) that message includes a cryptographic signature of the communication system and (ii) the cryptographic signature matches the anonymized identifier. This can be determined by applying the cryptographic signature function to data of the anonymized user identifier received in the response (after decrypting it in a scenario in which the message relay applies the signature to outgoing messages before they are encrypted), and comparing a resulting cryptographic signature with the one received in the message from the bot.

Accordingly, in embodiments, the message relay may be configured to reject any message received from the bot which includes an anonymized identifier unless that message (i) includes a cryptographic signature of the communication system and (ii) that signature matches the anonymized identifier in that message.

The message relay may be configured to apply a corresponding cryptographic signature function to data of the anonymized user identifier received in the response, and compare a resulting cryptographic signature with a cryptographic signature received from the bot in the response.

In embodiments, the anonymization function may be such that a character length of (i.e. the number of characters in) the user identifier is not derivable from a character length of the anonymized user function. That is, the anonymization function is such that it is not possible to tell what the length the original user identifier was from the anonymized version, which can be effected in various different ways (e.g. by using a fixed length for the anonymized identifier, randomizing its length, using a set of different fixed lights, each for a range of character length of the original user identifier etc.)

For example, the character length of the anonymized user identifier may be substantially independent of the character length of the anonymized user identifier.

"Substantially independent" means independent (i.e. completely independent), or independent over at least a subset of character lengths of the original user identifier—e.g. such that:

$$\text{length}[\alpha(uID, bID)] = \begin{cases} a \text{ for length}(uID) \in A \\ b \text{ for length}(uID) \in B \\ (\text{etc.}) \end{cases}$$

where α(*) is the anonymization function, uID is the user identifier, bID is the bot identifier, length(s) denotes the character length of character sting s, and A, B, . . . denote sets of multiple character lengths (e.g. ranges). In other words, the anonymization function may result in a one-to-many mapping of character lengths of the user identifier to character lengths of the anonymized user identifier. The communication system may for effecting communication events (e.g. calls, messaging sessions, screen sharing session, shared whiteboard sessions etc.) between users of the communication system, and the message may be transmitted in an established communication event between at least the user and at least the bot.

For example, the communication event may be a group communication event between the user, at least another of the users, and at least the bot. Alternatively or in addition, the communication event may be a group communication event between at least the user, the bot, and at least another of the bots, whereby a respective version of the message is sent to each of the bots which comprises an anonymized user identifier unique to that bot.

For the latter, the bots may in some cases be added as participants of the communication event at different times. E.g. the communication event may be established between the user and a bot, and another bot added subsequently, e.g. by the bot or by the user.

For example, the communication event may be a call and the message may comprise real-time audio and/or video data. Alternatively, the communication event may be a messaging session and the message may comprise a character string.

The communication system may be configured to receive from the bot a lookup request comprising the anonymized user identifier, perform a lookup using the user identifier, and return a result of the lookup to the bot.

A second aspect of the present invention is directed to a computer-implemented method of effecting communications between at least one user of a communication system and at least a target one of a plurality of bots, the bots being implemented by a plurality of code modules executed on one or more processors, the method comprising implementing, at the communication system, the following steps: receiving at a message relay of the communication system a message comprising an identifier of the user and an identifier of the target bot; generating an anonymized identifier of the user unique to the target bot, by applying an anonymization function to the user identifier and the bot identifier in the message; and transmitting to the target bot a version of the message, which comprises the anonymized user identifier and does not include the user identifier, wherein the user identifier is not rendered accessible to the target bot.

In embodiments the method may comprise receiving from the target bot a response to the version of the message generated automatically by the target bot, which includes the anonymized user identifier; detecting the anonymized user identifier in the response; and transmitting a version of the response to the user.

The anonymized version of the user identifier may an encrypted version of the user identifier generated by applying to the user identifier an encryption process unique to that bot.

For example, applying the encryption process may comprise determining a secret associated with the bot identifier in a cryptographic database, and applying an encryption function to the secret and the received user identifier or another user identifier associated with the received user identifier in a user database of the communication system.

In embodiments of the second aspect, any feature of the first aspect or any embodiment thereof may be implemented.

A third aspect of the present invention is directed to a computer program product comprising system code stored on a computer readable storage medium for effecting communications between at least one user of a communication system and at least a target one of a plurality of bots, the bots being implemented as a plurality of code modules executed on one or more processors, the system code configured when executed at the communication system to implement the method of the second aspect, any of the functionality of the computer system of the first aspect or any embodiment thereof.

A fourth aspect of the present invention is directed to a communication system for effecting communications between users of the communication system and a plurality of bots, the bots being implemented as a plurality of code modules executed on one or more processors, the communication system comprising: a message relay configured to receive a message comprising an identifier of one of the users and an identifier of a target one of the bots; and an anonymized identifier generator configured to generate an anonymized identifier of the user unique to the target bot, by applying an anonymization function to the user identifier and the bot identifier in the message; wherein the message relay is configured to transmit to the target bot a version of the message, which comprises the anonymized user identifier and does not include the user identifier, wherein the user identifier is not rendered accessible to the target bot.

In embodiments of the fourth aspect, any feature of any of the other aspects or any embodiment thereof may be implemented.

BRIEF DESCRIPTION OF FIGURES

For a better understanding of the present invention, and to show how embodiments of the same may be carried into effect, reference is made to the following figures in which:

FIG. 5A shows a schematic block diagram of a user device;

FIG. 5B shows an example graphical user interface.

DETAILED DESCRIPTION OF EXAMPLE EMBODIMENTS

A core principle underlying the described embodiments is that each bot has a secret that is generated within a communication system when the bot is created. This secret is not known to the bot. The communication system, when it calls out to the bot, performs a symmetric encryption of a user identifier (ID) using the secret for that bot and the resultant encrypted value is sent to the bot. This value remains the same for every (bot, user) pairing but is different for different bots as the secret is specific to a bot. That is, different identities are released for the same user to different bots i.e. differed pairwise IDs. That is, a unique ID is generated for each bot for the same user.

When the bot wants to send a message to a user, it again sends the encrypted value back to the communication system. The communication system uses the secret for that bot and decrypts the value to obtain the underlying user identifier and uses that identifier for processing.

Figure 1:
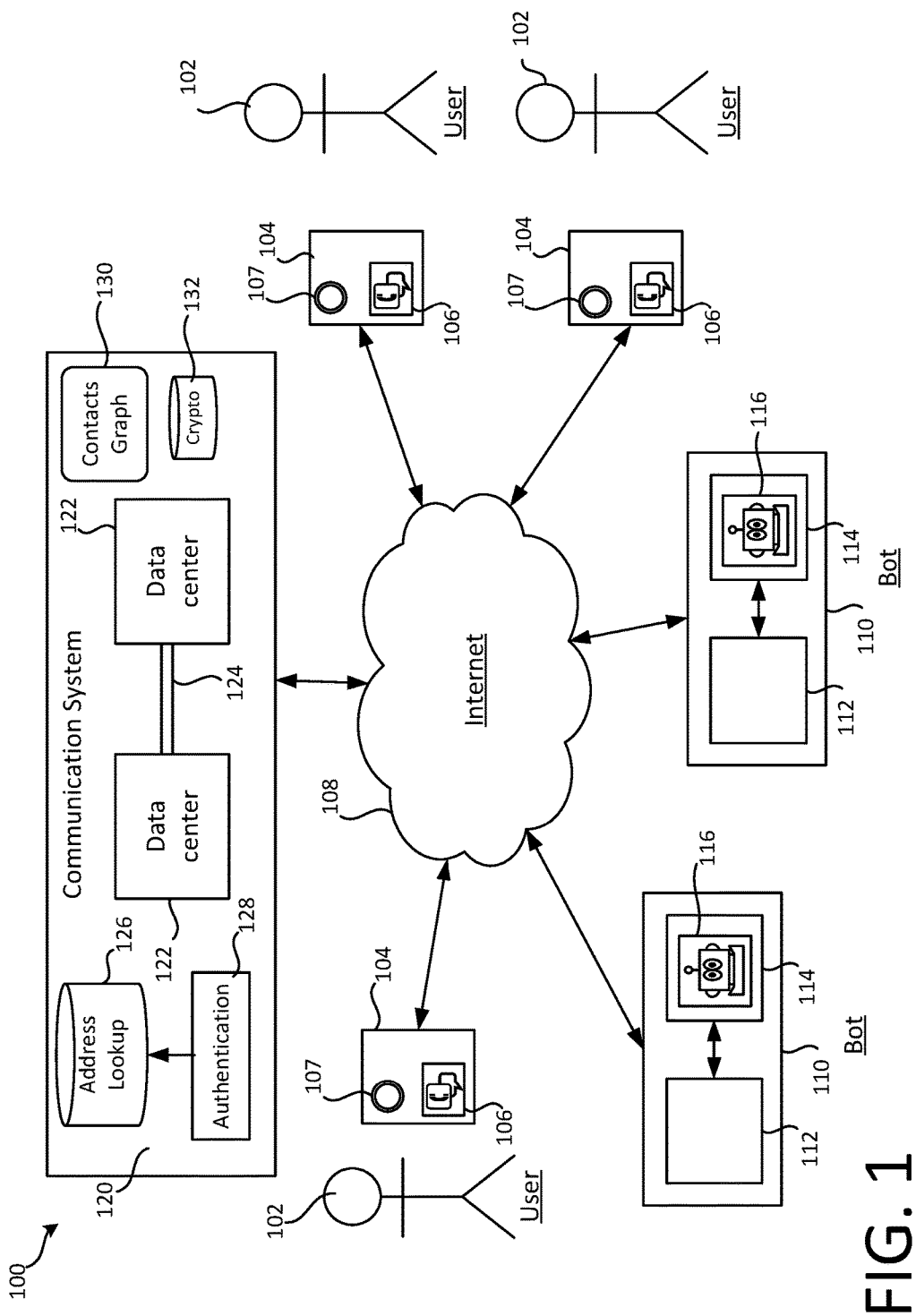
FIG. 1 shows a block diagram of a computer system, which includes a communication system and at least one bot.

FIG. 1 shows schematic a block diagram of a computer system 100. The computer system 100 comprises a communication system 120, a plurality of user devices 104, and a plurality of computer devices 110, each of which is connected to a packet based computer network 108, such as the Internet. The communication system 120 is shown to comprise a plurality of data centers 122.

Each of the user devices 104 is operated by a respective user 102, and comprises a processor configured to execute a communication client application 106. Herein, the term processor means any apparatus configured to execute code (i.e. software), and may for example comprise a CPU or set of interconnected CPUs.

The communication system 120 has functionality for effecting real-time communication events via the network 108 between the users 102 using their communication clients 106, such as calls (e.g. VoIP calls), instant messaging ("chat") sessions, shared whiteboard sessions, screen sharing sessions etc. A real-time communication event refers to an exchange of messages between two or more of the users 102 such that there is only a short delay (e.g. two seconds or less) between the transmission of a message from one of the clients 106 and its receipt at the other client(s) of the users 102 participating in the communication event. This also applies to transmission/receipt at the computer devices 110 in the case that at least one of the participants is a bot 116—see below.

The term "message" refers generally to content that is communicated between the users 102, plus any header data. The content can be text (character strings) but could also be real-time (synchronous) audio or video data. For example, a stream of messages carrying audio and (in some cases) video data may be exchanged between the users in real-time to effect a real-time audio or video call between the users.

For example, the communication system 12 may be configured to implement at least one communication controller, such as a call controller or messaging controller, configured to establish a communication event between two or more of the user's 102, and to manage the communication event once established. For example, the call controller may act as an intermediary (e.g. proxy server) in a signaling phase in which a communication event is established between two or more of the users 102, and may be responsible for maintaining up-to-date state data for the communication event once established.

The messaging controller may receive instant messages (that is, messages with text content) from each user in an instant messaging communication session, and relay the received messages to the other user(s) participating in the session. In some cases, it may also store copies of the messages centrally in the communication system 120, so they are accessible to the users at a later time, possibly using a different user device.

The controllers can for example be implemented as service instances or clusters of services instances (214, FIG. 2B—see below) executed at the data centers 122.

The communication system 120 is also configured to implement an address look-up database 126, and an authentication service 128. Although shown separately from the data centers 122, in some cases these may also be implemented at the data centers 122. The authentication service 128 and lookup database 126 cooperate to allow the users 102 to log in to the communication systems at their user devices 104 using their clients 106. The user 102 enters his credentials at his user device 104, for example a user identifier (ID)—e.g. username—and password, which are communicated to the authentication service 128 by the client 106. The authentication 128 service checks the credentials and, if valid, allows the user device 102 to log on to the communication system, for example by issuing an authentication token 107 to the user device 104. The authentication token 107 can for example be bound to the user device 104, such that it can only be used by that user device 104. Within the communication system 120, the authentication token 106 is associated with that user's user ID "uID" and can be presented to the communication system 120 thereafter as proof of the successful authentication whenever such proof is required by the communication system 120.

For example the authentication token 107 may comprise the user identifier uID, or it may not comprise uID and an association between the token 107 and uID may be stored within the communication system 120. In any event, note that the authentication token 107 constitutes an identifier of the user 102 in its own right, i.e. both uID (e.g. username) and the authentication token 107 are user identifiers in their own right.

In addition, the authentication service 128 generates in the address lookup database 126 an association between a network address of the authenticated user device (e.g. IP address of the user device 104 or transport address of the client 106) and the user's user ID. This allows other users to use that user's user ID to contact him at that that network address, subject to any restriction imposed by the communication system 120. For example, the communication system may only allow communication between users who are mutual contacts within the communication system 120.

The communication system 120 also comprises a current user database (contacts graph) 130, which is a computer implemented data structure denoting all current user's 108 (that is, comprising a record of all active user IDs) of the communication system 120.

The contacts graph 130 also denotes contact relationships between the users 102, i.e. a data structure denoting, for each of the users 108 of communication system, which other(s) of the users 108 are contacts of that user. Based on the contacts graph 130, each of the client 106 can display to its user 102 that user's contacts, which the user can select to instigate a communication event with, or receive messages from in a communication event instigated by one of his contacts.

The communication system also comprises a cryptographic database 132, the function of which is described below.

Note the databases 126, 130 and 132 can be implemented in any suitable fashion, distributed or localized.

Each of the computer devices 110 comprises computer storage in the form of a memory 114 holding at least one respective code module, and at least one processor 112 connected to the memory. The code module is thus accessible to the processor 112, and the processor 112 is configured to execute the code module to implement its functionality.

The term computer storage refers generally to an electronic storage device or set of electronic storage devices (which may be geographically localized or distributed), such as magnetic, optical or solid state electronic storage devices.

Each of the code modules is configured to implement, when executed on the processor 112, a respective bot 116, equivalently referred to herein as a software agent.

As described in further detail below, the computer system 100 has functionality in the form a bot API (application programming interface) to allow the bots 116 to participate in communication events effected by the communication system 120, along with the users 102.

A bot is an autonomous computer program, which automatically generates (without any direct oversight by a human) meaningful responses to messages sent from the clients 106 during a communication event in which the bot is also participating. That is, the bot autonomously responds to such messages in a manner akin to that of a human, to provide a natural and intuitive conversational experience for the user(s).

A communication event effected by the communication system 120 can be can be conducted between one of the users 102 and one of the bots 116, i.e. as a one-to-one communication event with two participants, one of whom is a bot. Alternatively, a communication event effected by the communication system 120 can be between multiple users 102 and one bot 116, multiple users 102 and multiple bots 116, or one user 102 and multiple bots 116, i.e. as a group communication event with three or more participants.

By way of example, two data centers 122 of the communication system 120 are shown, which are collocated and connected to each other by means of a dedicated, backbone connection 124 between the two data centers 122 (dedicated inter-data center connection). For example, a fiber-optic cable or set of fiber-optic cables between the two data centers. This allows data to be communicated between the two collocated data centers with very low latency, bypassing the network 108.

Figure 2A:
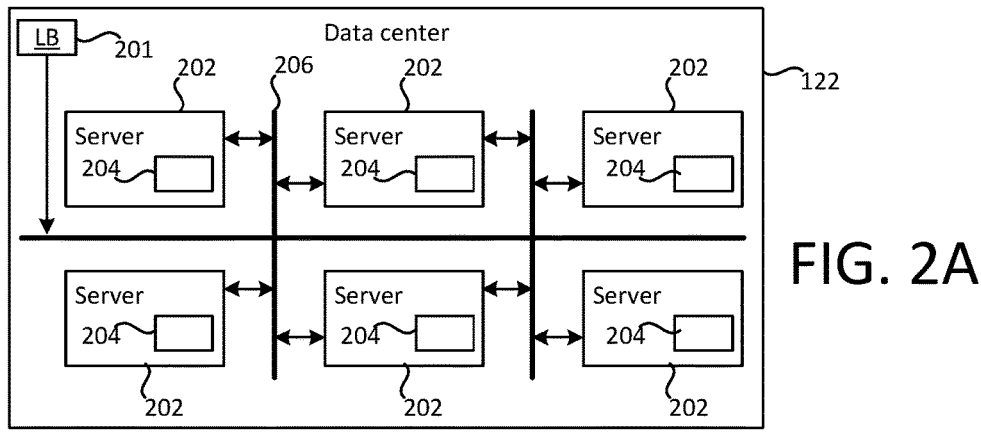
FIG. 2A shows a schematic block diagram of a data center.

FIG. 2A shows an example configuration of each of the data centers 122. As shown, each data center 122 comprises a plurality of server devices 202. Six server devices 202 are shown by way of example, but the data Center may comprise fewer or more (an possibly many more) server devices 202 (and different data centers 122 may have different numbers of server devices 202). The data center 122 has an internal network infrastructure 206 to which each of the servers 202 is connected, and which provides an internal service-to-service connection between each pair of servers 202 in the data center 122. Each of the servers 202 comprises at least one processor 204. A load balancer 201 receives incoming messages from the network 108, and relays each to an appropriate one of the server devices 202 via the internal network infrastructure 206.

Figure 2B:
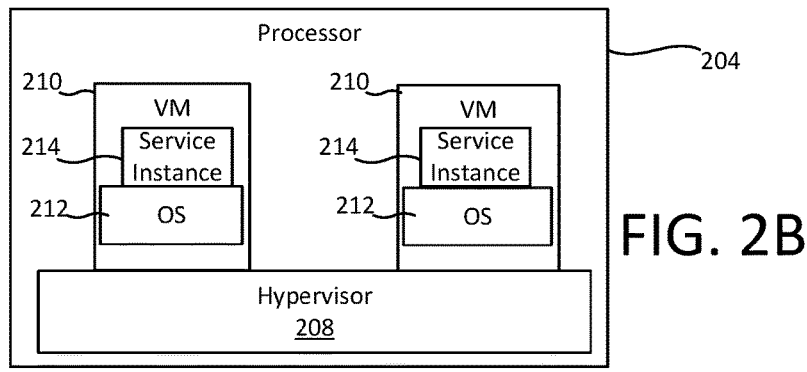
FIG. 2B shows a schematic block diagram of a processor of a data center.

To allow optimized allocation of the processing resources of the processors 204, virtualization is used. In this respect, as shown in FIG. 2B, each of the processors 204 runs a hypervisor 208. The hypervisor 208 is a piece of computer software that creates, runs and manages virtual machines, such as virtual servers 210. A respective operating system 212 (e.g. Windows Server™) runs on each of the virtual servers 210. Respective application code runs on each operating system 210, so as to implement a service instance 214.

Each of the service instances 214 implements respective functionality in order to provide a service, such as a call control or messaging control service. For example, a cluster of multiple service instances 214 providing the same service may run on different virtual servers 210 of the data center 122 to provide redundancy in case one fails, with incoming messages being relayed to service instances in the cluster selected by the load balancer 201. As indicated above, a controller of the communication system 120, such as a call controller or messaging controller, may be implemented as a service instance 214 or cluster of service instances providing a communication service, such as a call control or messaging control service.

This form of architecture is used, for example, in so-called cloud computing, and in this context the services are referred to as cloud services.

Figure 2C:
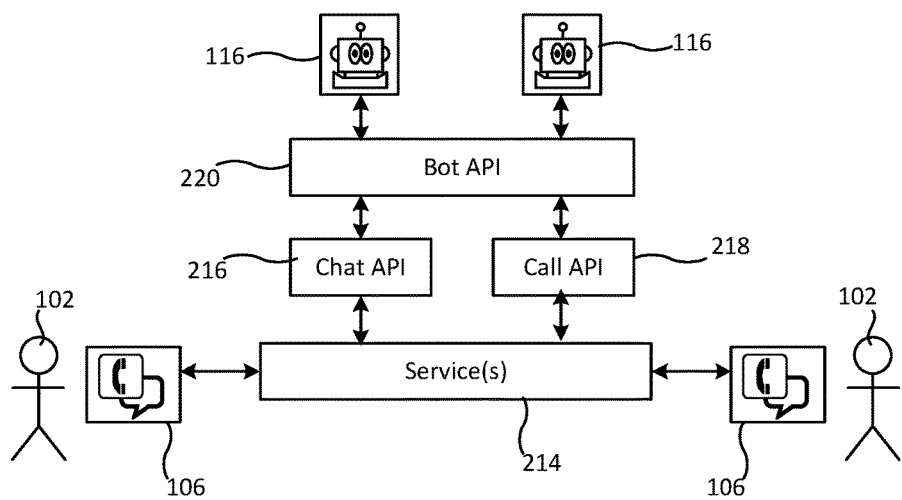
FIG. 2C shows a high level schematic representation of a system architecture.

FIG. 2C shows an example software architecture of the communication system 120, such that the users 102 can participate in communication events with the bots 116 using the communication infrastructure provided by the communication system, including the communication infrastructure of the communication system 120 described above with reference to FIGS. 1 to 2B.

As indicated, one or more communication services 214 provided by the communication system 122 allow the users 102 to participate in communication events with one another.

So that the bots 116 can also participate in the communication events, a bot interface in the form of a bot API 220 is provided. Separate messaging (chat) and call APIs 216, 218 are provided, which provide a means by bots can participate in messaging session (text-based) and calls (audio and/or video) respectively. If any when a communication service 214 needs to communicate information to one of the bots 116 in a chat (text) or call (audio/video), it instigates one or more functions of the chat API 216 and call API 218 as appropriate, which in turn instigates one or more functions of the bot API 220. In the other direction, if and when the bot 116 needs to transmit information to one or more of the users 102 in a chat or call, the bot instigates one or more functions of the bot API 220, which in turn instigates one or more functions of the chat or call API 216, 218 as appropriate.

Each of the APIs 216, 218, 220 can for example be implemented as code executed on a processor or processors of the communication system 120—for example, in the form of a library—configured to provide a set of functions. Depending on where the API is called from, these functions may be instigated (i.e. called) locally, or they may be called remotely via a network interface(s) coupled to the processor(s), for example via the network 102 or using low latency back-end network infrastructure of the communication system 120, such as the internal data center network infrastructure 206 and inter-data center backbone 124. For "internal" API calls made from within the communication system 120, it may be preferable in some contexts to use only the latter where possible.

In any event, each of the APIs can generally be implemented as code executed on a processor accessible to at least two computer programs (at least one bot 116, and at least service instance 214)—which may or may not be executed on the same processor or processors—and which can be used by each of those programs to communicate with the other of those programs.

The bot API 220 allows the bots 116 to participate in communication events effected by an existing communication system, such as Skype, FaceTime, Google Voice, Facebook chat etc. That is, it provides a means by which functionality for communicating with bots as well as users can be incorporated into a communication system originally designed for users only, using the existing, underlying communications infrastructure of the communication system (such as its existing authentication, address lookup and user interface mechanisms).

In this sense, the bots 116 are third party systems from the perspective of the communication system, in the sense that they can be developed and implemented independently by a bot developer, and interface with the communication system 120 via the bot API 220.

Figure 3:
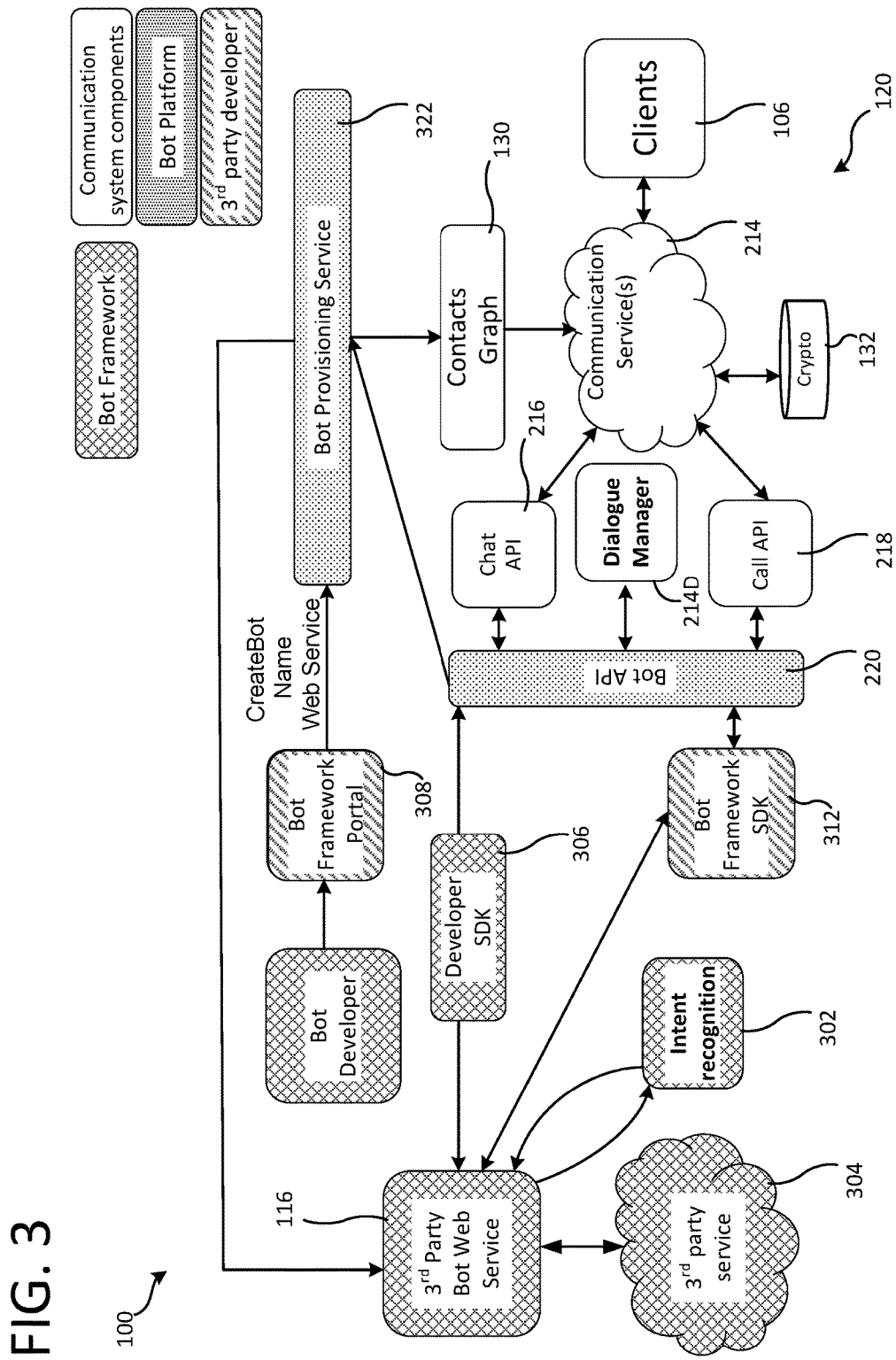
FIG. 3 shows a more detailed schematic representation of a system architecture.

FIG. 3 shows additional details one example software architecture of the computer system 100. In addition to the components already described with reference to FIGS. 1 and 2A-C, for which the same reference signs are used, additional software components are shown.

To create an customize a bot 116 that users 102 of the communication system 120 can communicate with using the communication infrastructure of the communication system 120, the bot developer can use a bot framework portal 308 to instigate a bot creation instruction to a bot provisioning service 322, which may also be implemented as a cloud service. For the creation of his bot 116, the bot developer can use a bot framework SDK 312 provided by the operator of the communication system 120, or alternatively he may build his own SDK 306 that is compatible with the bot API 220E. SDK stands for software development kit.

The bot provisioning service 322 interacts with the contacts graph 130, so as to add the newly-created bot 116 as a "user" of the communication system 120, in the sense that the bot 116 appears as a user within the communication system to the (real) users 108. For example, such that a user 102 can add the bot 116 as a contact, by instigated a contact request at his client 116 (which may be automatically accepted). Alternatively, any user 102 may be able to communicate with a bot 116 using his client 116 without having to add that bot as a contact explicitly, though the option to do so may still be provided for convenience. In any event, the user 102 is able to initiate a communication event, such as a chat or call, with the bot 116 as he would with another real, human user 102 of the communication system 120.

Each of the bots 116 thus has a unique identity within the communication system 120, as denoted by an identifier "bID" of that bot in the contacts 130 that is unique to that bot within the system, where the integer "M" is used to denote the total number of bots having such an identity within the communication system 120 i.e. there are M unique bot identifiers in the contacts graph 130, where "bIDm" denotes the mth bot identifier.

The integer N denotes the total number of users who have an identity within the communication system 120, i.e. there are N human user identifiers in the contacts graph 130, wherein "uIDn" denotes the nth user identifier.

Thus, to actual human users 108 of the communication system, there appear to be N+M "users"—N humans 108, plus M bots 116.

One bot 116 is shown by way of example in FIG. 3, but it will be appreciated that the following description pertains to each of the multiple bots 116 individually.

The bot 116 communicates with a third party service 304 (i.e. outside of the domain and infrastructure of the communication system 120), which can be one of an extensive variety of types, for example an external search engine, social media platform, e-commerce platform (e.g. for purchasing goods, or ordering takeaway food and drinks etc.). The bot 116 acts as an intermediary between the user's 108 and the third party service, so that user can access the third party service in an intuitive manner by way of a natural conversation with the bot 116. That is, the bot 116 constitutes a conversational (i.e. natural language) interface between the user 102 and the third part service 304.

The user's engagement with the bot 116 is conversational in the sense that the precise format of his request to the bots is not prescribed. For example, suppose the third party service 304 is an online takeaway service, and the user want's to order a Pizza.

In this case, the user 102 can, say, instigate a chat message to the bot 116 using his communication client 106. The user need not concern himself the semantics of the textual content of the message and can, for example, start by saying to the bot 116 "please can I order a Pizza?", or "Hi, I'd like a pizza please" or "order Pizza"—that is, by expressing his general intent to order a pizza to the bot without additional details at this stage—or with a more specific request, such as "I'd like a pepperoni pizza", or "please deliver a pizza in two hours to my home address"—that is expressing additional details of his intent.

In order to interpret these correctly, the bot need to understand the user's intent, in whatever manner and to whatever level of detail the user 102 has chosen to express it. To this end, some form of intent recognition needs to be applied to the content of the message, in order to identify the user's intent to the extent it can be identified—e.g. to identify that the user wants to order a pizza but has specified no details, or that he want to order a specific type of pizza but has not specified a time or place, or that he wants a pizza at a specific time and place but has not specified details of the pizza etc.

Intent recognition is known in the art, and for that reason details of specific intent recognition processes will not be described herein.

For example, a third party intent recognition service 302 may be used by the bot, wherein the bot 116 supplies content of messages it receives to the third party intent recognition service for intent recognition. Alternatively the bot 116 itself may implement the intent recognition functionality. Alternatively the intent recognition may be pre-applied within the communication system 202, by a dialogue manager 214D, i.e. intent recognition may be applied to a message received from one of the user's 102 within the communication system 120 itself by the dialogue manager 214D, before the message is communicated to the bot. The dialogue manager 214D can also be implemented a service instance or service instance cluster running in one of the data centers 122, for example as another cloud service.

The aim of the intent recognition processing is to determine a user's intent in any given context.

The intent recognition process incorporates natural language processing, and uses a predetermined set of intents and predetermined set of associated entities, i.e. things to which the intents can apply. These sets may be extensive to provide comprehensive intent recognition, for example several hundred intents and entities in various domains.

Figure 4:
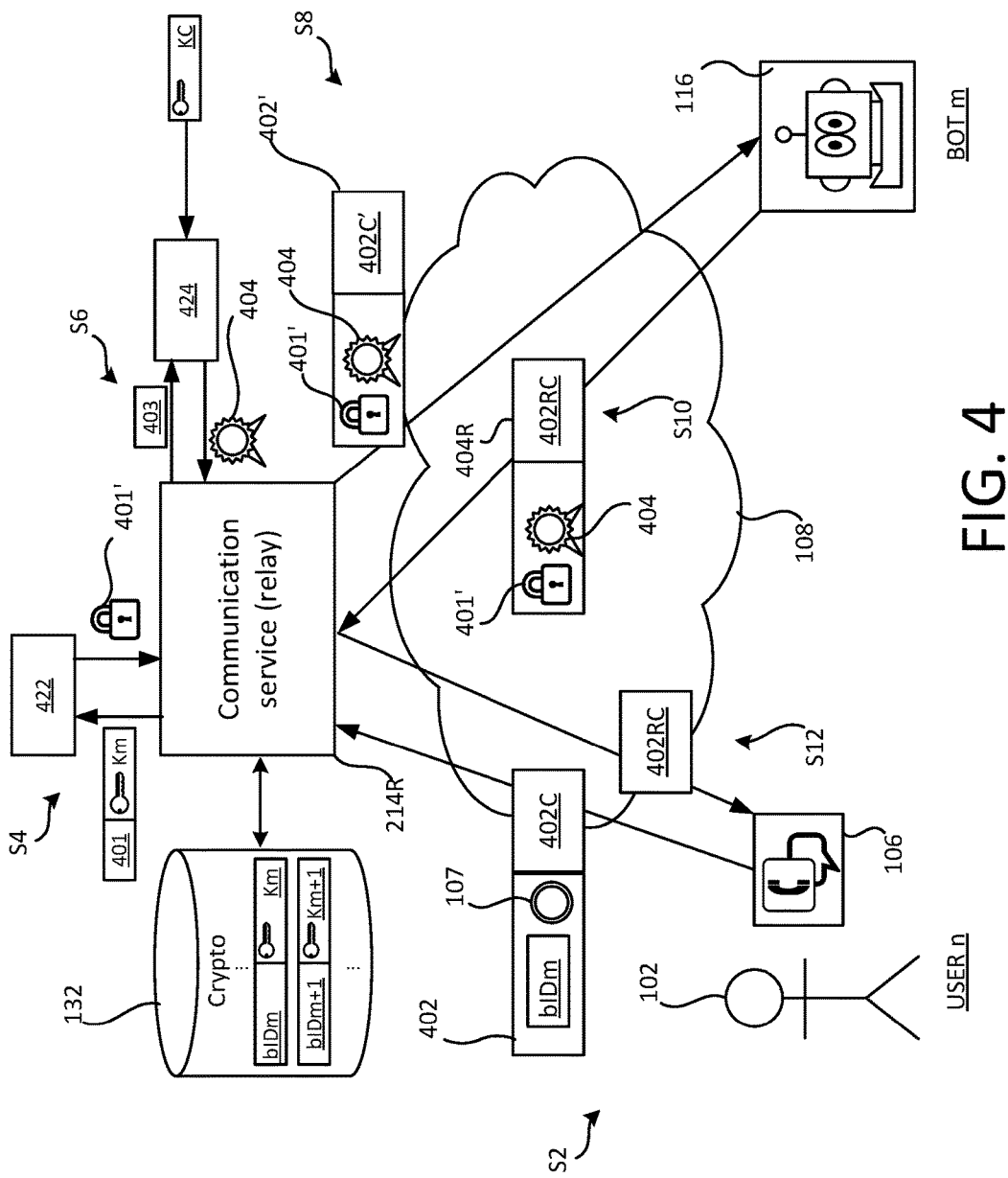
FIG. 4 shows an example signaling flow between a user and a bot via a message relay of a communication system.

FIG. 4 shows steps of an example message flow between a client 106 of user 102 ("user n") and one of the bots 116 ("bot m") via a message relay service 214R of the service(s) 214 of the communication system (message relay).

At step S2, a message 402 is transmitted from user n to the message relay 214R, which in this example comprises the user's authentication token 107 and an identifier of bot m ("bIDm"—target bot), as well as content 402C which may be text (character sting), asynchronous media data (e.g. images, or audio or video clips), or real-time audio data or real-time video data for example, and in any event is a message of a communication event (chat, call etc.) between user n and bot m.

The authentication token 107 acts both to identify user n, and for authentication purposes so that that the communication system 120 knows to accept the message 402.

As shown, the cryptographic database 132 holds, in association with each bot identifier bIDm, bIDm+1 . . . , a cryptographic secret Km, Km+1 unique to that bot. Each bot ID and key pairing constitutes a bot description, access to which may be regulated by a bot storage service of the services 214 (not shown).

The secrets Km, Km+1 are private cryptographic keys, which are unknown outside of the communication system. Each of the keys can for example be generated when the corresponding bot is created and given an identity within the communication system 120 by the bot provisioning service 322.

Before relaying a version of the message 402 to bot m, the message relay 214R applies steps to anonymize user n's identity.

At step S4, the message relay 214R retrieves the secret Km associated with bIDm as received in the message 402, and applies an encryption function 422 to a combination of the secret Km and an identifier 401 of user n, thereby generating an encrypted version 401' of the identifier 401. The identifier 401 may be the authentication token itself 107, or the user identifier uID with which the authentication token 107 is associated.

The encryption is preferably symmetric i.e. the same key Km is used for both encryption and decryption, both of which are only ever performed within the communication system 120.

For example, the bot API 220 can be configured to provide a function (or respective functions), which can be instigated by the relay 214R via the call API 218 or chat API 216 as applicable to fetch a set of bot descriptions from the bot storage service.

Given that information the message relay 214R can encrypt data for any given bot target.

At step S6, the message relay 214R applies a cryptographic signature function 424 to data 403 of the user identifier 401 using a private cryptographic key Kc, thereby generating a digital cryptographic signature 404 unique to the data 403 in a process that cannot be replicated without the private key KC and thus cannot be replicated outside of the communication system 120. The key KC may be the same secret Km that is used to encrypt the identifier 401, or it may be a different secret.

The data 403 may be data of the unencrypted user identifier 401 (i.e. the signature may be a generated "before" encryption), or it may be data of the encrypted identifier 401'. Where data 403 is unencrypted data, steps S4 and S6 can be performed in any order or in parallel.

At step S8, the message relay 214R transmits to bot m a version 402' of the message 402, which comprises the encrypted identifier 401' and the digital signature 404. This version 402' comprises content 402C', which may be the same the original message content 402C'. In the case that intent recognition is preformed within the communication system 120 by the dialogue manager 214D, the content 402C' may comprise data generated in the intent recognition, in addition to or instead of the original content 402C.

In any event, bot m processes the content 402C' of the version of the message 402' that is receives, in order to automatically generate a response 402R. The response 402R comprises its own content 402RC intended for user n, and also comprises the encrypted user identifier 401' and the digital signature 404. Bot m transmits the response 402R back to the message relay 214R, where it is received.

The message relay 414R determines that the response has originated from bot m, and accordingly decrypts the encrypted identifier 401' in the response 402R, and thereby obtains the original, unencrypted identifier 401, using the secret Km associated with and unique to bot m. For example, the response 402R may comprise the bot identifier bIDm. It also verifies that the digital signature 404 in the response 402' is valid, i.e. that it matches the identifier 401' in the received response 402R, using the key KC (this prevents a nefarious bot from being able to fabricate anonymized user identifiers, as without access to the key KC they are unable to provide a matching signature).

Providing the signature 404 is valid, the message relay transmits (S12) at least the content 402RC of the response to user m, who it identifies as the intended recipient based on the decrypted identifier 401.

That is, the message relay 214R decrypts the pairwise id if the bot 116 provides its bot ID in an incoming message (e.g. response 404R) together with pairwise ID (bID), provided the signature 404 in that message form the bot 116 (e.g. response 402R) is valid.

At no time during this process is the user's identity within the communication system 120 revealed to the bot, as the bot never receives an unencrypted version of uID or the token 107. Nevertheless, if and when a further message is sent from user m to bot m, the same encryption is applied to the same identifier 401, thus the bot receives the same encrypted identifier 401' and thus knows it is communicating with the same user. That is to say, bot m is presented with a consistent but anonymized identity of user n. Because each of the secrets in the cryptographic database 132 is unique to its corresponding bots, no two bots ever see the same identifier for the same user.

The messages 402, 402' and responses 402R, 402RC are transmitted via the network 108.

For simplification, a one-to-one communication event is shown in FIG. 4. However, the same techniques can be applied to a group communication event with multiple users 102 and/or multiple bots 116. In the case of multiple bots in the same group communication event, each is presented with a different anonymized identity of the user(s), and thus cannot engage in nefarious collusion during the group communication event or after it.

The message 402' may for example be transmitted to the bot 116 using a push mechanism, such as a Webhook. The message 402' may for example be a JSON message.

Note that, in certain circumstances, it may be beneficial for the user for the bot to be able to access information about the user from a third party service. However, the bot is unable to do so directly, because the user's identity is anonymized.

To maintain anonymization, whilst still permitting this, access to such third party services may be mediated by the communication system 120. Thus, for example, a bot 116 may send a request to the communication system 120 for the communication system 120 to perform a lookup via a third party service based on the original user identifier 401 (which the bot does not have access to). Subject to receiving the user's informed consent, the communication system performs the look-up on behalf of the bot, and returns the results to the bot.

FIG. 5A a schematic block diagram of a user device 104. The user device 104 is a computer device which can take a number of forms e.g. that of a desktop or laptop computer, mobile phone (e.g. smartphone), tablet computing device, wearable computing device, television (e.g. smart TV), set-top box, gaming console etc. The user device 104 comprises computer storage in the form of a memory 507, a processor 505 to which is connected the memory 507, one or more output devices, such as a display 501, loudspeaker(s) etc., one or more input devices, such as a camera, microphone, and a network interface 503, such as an Ethernet, Wi-Fi or mobile network (e.g. 3G, LTE etc.) interface which enables the user device 104 to connect to the network 108. The display 501 may comprise a touchscreen which can receive touch input from a user of the device 6, in which case the display 24 is also an input device of the user device 6. Any of the various components shown connected to the processor may be integrated in the user device 104, or non-integrated and connected to the processor 505 via a suitable external interface (wired e.g. Ethernet, USB, FireWire etc. or wireless e.g. Wi-Fi, Bluetooth, NFC etc.). The processor 505 executes the client application 106 to allow the user 102 to use the communication system 120. The memory 507 holds the authentication token. The client 106 has a user interface for receiving information from and outputting information to a user of the user device 104, including during a communication event such as a call or chat session. The user interface may comprise, for example, a Graphical User Interface (GUI) which outputs information via the display 501 and/or a Natural User Interface (NUI) which enables the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

FIG. 5B shows an example of a graphical user interface (GUI) 500 of the client 106, which is displayed on the display 501.

The GUI includes a contact list 504 which is displayed in a portion of an available display area of the display 501. Multiple display elements are shown in the contact list, each representing one of the user's contacts, which includes display elements 502U, 502B representing a human contact (i.e. another of the users 102) and a bot contact (i.e. one of the bots 116) respectively. That is, the bot 116 is displayed in the contact list 504 along with the users human contacts.

The user can send chat messages 402 to the bot via the GUI 500, whose content 402C is displayed in a second portion of the display area along with the content 402R of the bot's responses 402R.

Although only one bots is shown in the contact list 504, multiple bots may appear here e.g. if the user has added them as contacts. For example, during a communication event in which the user and a bot are participating, the user can add another bot to the established communication event as an additional participant.

The terms "module" and "component" refer to program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors. The instructions may be provided by the computer-readable medium to a processor through a variety of different configurations. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, solid-state (e.g. flash) memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A relay system comprising:
at least one processor; and
one or more computer-readable storage media having instructions stored thereon that are executable by the at least one processor to perform operations comprising:
receiving, at the relay system, a message including an identifier of a sending user and an identifier of an intended recipient;
determining an encryption process for the intended recipient based on the identifier of the intended recipient, wherein an encryption function applied by the encryption process is unique to the intended recipient;
generating an anonymized identifier of the sending user by applying the determined encryption process to generate an encrypted version of the identifier of the sending user to provide to the intended recipient;
generating a version of the message that includes the anonymized identifier of the sending user and does not include an unencrypted version of the identifier of the sending user; and
sending, for receipt by the intended recipient, the version of the message that includes the anonymized identifier of the sending user and does not include the unencrypted version of the identifier of the sending user;
wherein the identifier of the sending user is obtainable, from the version of the message including the anonymized identifier, with a decryption process that corresponds to the determined encryption process.

2. The system as recited in claim 1, wherein the version of the message that includes the anonymized identifier of the sending user and does not include the identifier of the sending user further includes a cryptographic signature of the relay system.

3. The system as recited in claim 2, the operations further comprising receiving a response from the intended recipient and transmitting a version of the response from the intended recipient to the sending user in response to determining that the response includes the cryptographic signature of the relay system.

4. The system as recited in claim 2, the operations further comprising receiving a response to the version of the message, determining that the response to the version of the message does not include a cryptographic signature of the relay system, and rejecting the response to the version of the message.

5. The system as recited in claim 1, the operations further comprising receiving a response from the intended recipient addressed to the anonymized identifier of the sending user, generating a version of the response that does not include the anonymized identifier of the sending user, and transmitting the version of the response that does not include the anonymized identifier of the sending user to the sending user.

6. The system as recited in claim 5, wherein generating the version of the response that does not include the anonymized identifier of the sending user comprises determining the identifier of the sending user by applying a reverse of the determined encryption process for the intended recipient to the anonymized identifier of the sending user and including the identifier of the sending user in the version of the response that does not include the anonymized identifier of the sending user.

7. The system as recited in claim 1, the message further including an identifier of an additional intended recipient and the operations further comprising:
determining a different encryption process for the additional intended recipient based on the identifier of the additional intended recipient;
generating a different anonymized identifier of the sending user by applying the different encryption process to the message;
generating a different version of the message that includes the different anonymized identifier of the sending user and does not include the identifier of the sending user; and
sending, for receipt by the additional intended recipient, the different version of the message that includes the different anonymized identifier of the sending user and does not include the identifier of the sending user.

8. The system as recited in claim 7, wherein applying a reverse of the different encryption process to the anonymized identifier of the sending user generates an identifier that is different from the identifier of the sending user.

9. The system as recited in claim 1, wherein the message includes at least one of video data or audio data.

10. A relay system comprising:
at least one processor; and
one or more computer-readable storage media having instructions stored thereon that are executable by the at least one processor to perform operations comprising:
receiving, at the relay system, a message that includes an identifier of a sender and an anonymized identifier of an intended recipient user, wherein an unencrypted identifier of the intended recipient user is obtainable from the message from decryption;
determining an encryption process applied for the sender based on the identifier of the sender, wherein an encryption function of the encryption process is unique to the sender, and wherein the anonymized identifier of the intended recipient user is produced from application of the encryption function to the unencrypted identifier of the intended recipient user;
determining the unencrypted identifier of the intended recipient user by applying a reverse of the encryption process applied for the sender to the unencrypted identifier, to decrypt the anonymized identifier; and
transmitting a version of the message to the intended recipient user using the unencrypted identifier of the intended recipient user.

11. The system as recited in claim 10, the operations further comprising determining whether the received message includes a cryptographic signature of the relay system, wherein the determining the encryption process for the sender, the determining the unencrypted identifier of the intended recipient user, and the transmitting the version of the message to the intended recipient user are performed in response to the received message including the cryptographic signature of the relay system.

12. The system as recited in claim 11, wherein the version of the message includes the unencrypted identifier of the intended recipient user and does not include the anonymized identifier of the intended recipient user.

13. The system as recited in claim 11, the operations further comprising generating the anonymized identifier of the intended recipient user and providing the anonymized identifier of the intended recipient user to the sender prior to receiving the message.

14. A method comprising:
receiving, by a computing device, a message including an identifier of a sending user and an identifier of an intended recipient;
sending, by the computing device, a version of the message to the intended recipient, the version of the message including an anonymized identifier of the sending user and not including an unencrypted version of the identifier of the sending user, wherein the anonymized identifier is an encrypted version of the identifier of the sending user, wherein the encrypted version is generated by applying an encryption function unique to the intended recipient, and wherein the identifier of the sending user is obtainable, from the version of the message including the anonymized identifier, with a decryption process that corresponds to the encryption function;
receiving, by the computing device, a response to the version of the message from the intended recipient that includes the anonymized identifier of the sending user;
determining, by the computing device, the identifier of the sending user from the response, independent of stored information describing a relationship between the identifier of the sending user and the anonymized identifier of the sending user; and
sending, by the computing device, the response to the sending user based on the determined identifier of the sending user.

15. The method as recited in claim 14, the version of the message further including a cryptographic signature of the computing device.

16. The method as recited in claim 15, further comprising verifying that the received response includes the cryptographic signature of the computing device before sending the response to the sending user.

17. The method as recited in claim 14, further comprising receiving a response to the version of the message that does not include a cryptographic signature of computing device and rejecting the response that does not include the cryptographic signature of the computing device.

18. The method as recited in claim 14, further comprising:
determining an encryption process for the intended recipient; and
generating the anonymized identifier of the sending user by applying the encryption process for the intended recipient to the identifier of the sending user.

19. The method as recited in claim 14, wherein determining the identifier of the sending user comprises determining an encryption process for the intended recipient and applying a reverse of the encryption process for the intended recipient to the anonymized identifier of the sending user.

20. The method as recited in claim 14, the message further including an identifier of an additional intended recipient and the method further comprising:
determining an encryption process for the additional intended recipient that is different from an encryption process for the intended recipient;
generating a different anonymized identifier of the sending user by applying the encryption process for the additional intended recipient to the identifier of the sending user; and
sending a different version of the message to the additional intended recipient, the different version of the message including the different anonymized identifier of the sending user.

* * * * *